March 29, 1955    H. B. BARRETT    2,704,881
CARBIDE TIPPED CUTTING TOOLS
Filed April 19, 1950

INVENTOR.
HARRY B. BARRETT
BY
Alfred W. Petchaft
ATTORNEY

United States Patent Office 2,704,881
Patented Mar. 29, 1955

2,704,881

CARBIDE TIPPED CUTTING TOOLS

Harry B. Barrett, St. Louis, Mo.

Application April 19, 1950, Serial No. 156,836

4 Claims. (Cl. 29—96)

This invention relates in general to carbide tipped cutting tools and, more particularly, to certain new and useful improvements in carbide cutting tools having replaceable tips.

Although the effectiveness of carbide tool bits for use in general turning and planing work has long been recognized, there are several factors peculiar to such usage which have measurably limited the extent of their utilization for general machine shop operation. Special skill on the part of the operator is required in the productive use of carbide tool bits, and hence average size machine shops not customarily having highly trained operatives, have not been able to adopt said tools for their usage. Furthermore, carbide cutters are expensive in comparison to the conventional steel bits, and are relatively easily damaged through chipping. Additionally, such cutters are difficult to grind once the cutting edge has become dull through use, and can only be ground upon special machines, which are not conventionally found in average machine shops.

Therefore, it is a primary object of the present invention to provide a carbide-tipped tool of the type stated, contoured to present a small symmetrically formed carbide cutter at the required angle to the work.

It is a further object of the present invention to provide a carbide-tipped tool of the character stated which does not come into contact with the work during usage and hence is permanently capable of assuring the proper degree of feed of a carbide cutter to the work, while the cutter may be discarded and replaced at nominal expense, after it has become dulled or chipped.

It is an additional object of the present invention to provide a tool holder of the character stated which is economical in manufacture, and durable and reliable in usage.

With the above and other objects in view, my invention resides in the novel features of form, construction, arrangement, and combination of parts presently described and pointed out in the claims.

In the accompanying drawings (two sheets):

Figure 1:
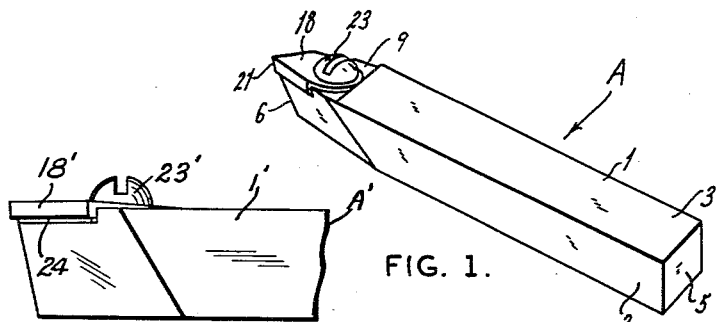
Figure 1 is a perspective view of a carbide-tipped tool constructed in accordance with and embodying the present invention.

Referring now by reference characters to the drawing, which illustrates practical embodiments of the present invention, A designates a tool fabricated of steel, having a straight shank 1, and being square in cross section, with side faces 2, 2', a top face 3, a bottom face 4, and a rear end face 5. At its forward end, the holder A is contoured to form a leading edge 6, which is rearwardly and downwardly inclined to provide a front clearance angle 7, and is laterally displaced with relation to the longitudinal axis of the shank 1 to provide a side clearance, as at 8, with relation to the plane of the side face 2.

Figures 2, 7:
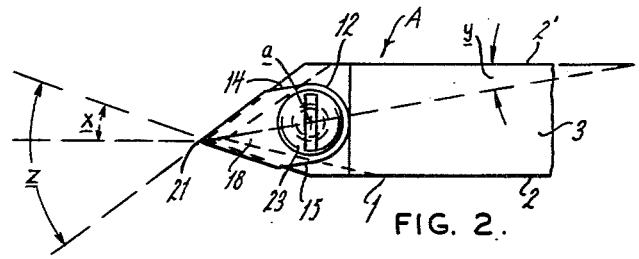
Figure 2 is a fragmentary top plan view.
Figure 7 is a fragmentary side elevational view of a modified form of carbide tipped tool constructed in accordance with the present invention.
Figure 3:
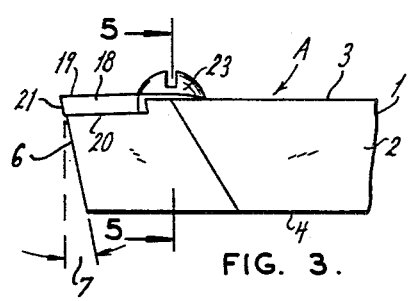
Figure 3 is a fragmentary side view.
Figure 9:
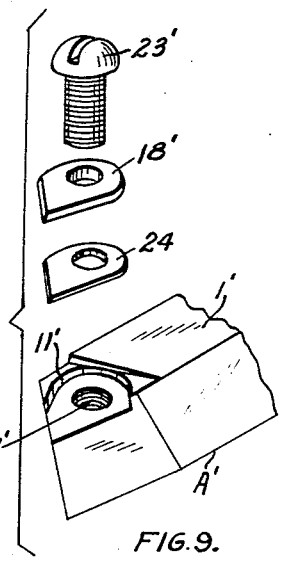
Figure 9 is a fragmentary exploded view of the modified form of tool.

In its upper portion, the forward end of the holder A is provided with a laterally beveled surface 9, which is flush with the line of intersection between the side face 2 and top face 3 and slopes downwardly and outwardly toward the side face 2' to form a side rake angle 10. Formed in, and extending downwardly from, the surface 9 is an upwardly opening recess 11, the bottom wall 12 of which is parallel to the surface 9. The wall 13 of the recess 11 comprises opposed lateral portions 14, 15, which are parallel to each other and perpendicular to the surface 9 and a rearward arcuate portion 16, to which the lateral portions 14 and 15 are tangentially related. The recess 11 is symmetrical about an axis $a$ which intersects the leading edge 6, and extends rearwardly therefrom at an angle $y$ to the side face 2, so that the lateral wall portion 14 extends slightly forwardly beyond the forward margin of the lateral portion 15, as best seen in Figure 2.

Tapped into the bottom wall 12 of the recess 11 concentric with the arcuate wall portion 16 is an internally threaded bore 17, the axis of which is perpendicular to the surface 9 and is, hence, angularly disposed to the leading edge 6.

Figure 4:
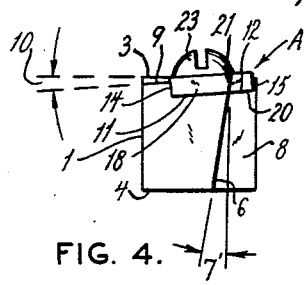
Figure 4 is a front view.
Figure 6:
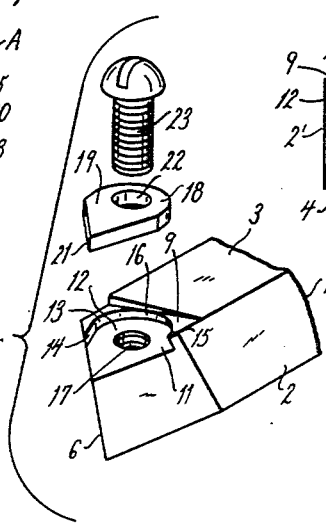
Figure 6 is a fragmentary exploded view.
Figure 5:
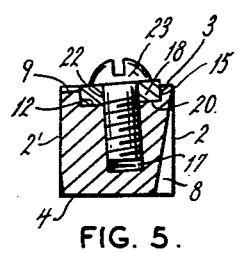
Figure 5 is a transverse sectional view taken along line 5—5 of Figure 3.
Figure 8:
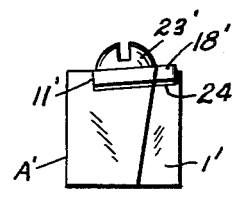
Figure 8 is a front elevational view of the modified form of tool.

Provided for snug-fitting disposition within the recess 11 is a cutter or tool bit 18, fabricated preferably of tungsten carbide, having flat, parallel top and bottom faces 19, 20, and being symmetrically contoured to match the shape of the recess 11. Said cutter 18 is further provided with a forwardly presented vertical cutting edge 21, so located, that, when the cutter 18 is disposed within the recess 11, the cutting edge 21 extends slightly forward and to one side of the leading edge 2 of the holder A as best seen in Figure 4. It will be seen that the cutter 18 is in abutting engagement with the recess 11 throughout its bottom and side faces thus providing a firm and rigid support therefor, preventing any unauthorized lateral or rearward displacement during operation.

The cutter 18 is provided with an aperture 22 aligned with the bore 17 for receiving a retaining screw 23 which is securely threaded into the bore 17. The underface of the head of the screw 23 tightly abuts against the adjacent portion of the top face 19 of the cutter 18 to prevent any upward displacement of the cutter 18 which may be occasioned during usage. Thus, as hereinabove shown, the cutter 18 is fixedly held against dislodgement by supports on its top, bottom and lateral portions.

It will be noted that the cutter 18 is relatively small and symmetrically formed and is, therefore, easily manufactured in volume at a most economical cost. In the event the cutter 18 should lose its effectiveness through usage or destruction, it may be discarded and a new one inserted in the recess 11, at a nominal expense. Thus, the tool A is long-lived and since it is not subjected to contact with the work during operation, will maintain its contours permanently. It is to be most particularly noted that the replaceable character of the cutter 18 obviates the need for special expensive grinding equipment heretofore necessary where carbide cutters were used.

It has been found in connection with the present tool that the preferable settings to which the various angular faces of the tool and bit should be ground are approximately as follows:

| | Degrees |
|---|---|
| Angle 7 | 20 |
| Angle 7' | 10 |
| Angle 10 | 10 |
| Angle $x$ | 10 |
| Angle $y$ | 20 |
| Angle $z$ | 60 |

If desired a modified form of carbide-tipped tool A' may be provided which is substantially identical with the previously described embodiment A, comprising a shank 1' provided in its forward end with a recess 11' having an internally threaded bore 17' for receiving a retaining screw 23' which, in turn, holds a carbide cutting bit 18' in the recess 11'. However, a thin metallic pad 24 is provided of the same peripheral contour or shape as the recess 11 for insertion therein to underlie the bit 18'. The pad is formed preferably of soft brass or other highly malleable metal and serves both to assist in forming a tight seat for the under face of the bit 18' and to absorb some of the shock sustained by the bit 18'.

It should be understood that changes and modifications in the form, construction, arrangement, and combination of the several parts of the carbide-tipped cutting tools may be made and substituted for those herein shown and described without departing from the nature and principle of my invention.

Having thus described my invention, what I claim and desire to secure by Letters Patent is:

1. A carbide-tipped cutting tool comprising a shank having its forward end contoured to form a leading edge having front and side clearances, said front end being cut away in its upper portion and having a forwardly and upwardly opening recess which is symmetrical about a line angularly disposed to the longitudinal axis of the shank, a carbide-tip disposed in snug-fitting relation within the recess, means for retentively holding the tip in the recess thereon, and a pad forming shim having a peripheral shape substantially identical with the peripheral shape of the under face of the tip, said shim being interposed between the tip and the bottom of the recess.

2. A carbide-tipped cutting tool comprising a shank having its forward end contoured to form a leading edge having front and side clearances, said front end being cut away in its upper portion and having a forwardly and upwardly opening recess which is symmetrical about a line angularly disposed to the longitudinal axis of the shank, a carbide-tip disposed in snug-fitting relation within the recess, means for retentively holding the tip in the recess thereon, and a pad forming shim having a peripheral shape substantially identical with the peripheral shape of the under face of the tip, said shim being interposed between the tip and the bottom of the recess, said shim being formed of relatively soft metal for absorbing shock and slight irregularities in the under face of the tip.

3. A carbide-tipped cutting tool comprising a shank having a flat top face and a forward end contoured to form a leading edge having front and side clearances, said front end being cut away in its upper portion and having a forwardly and upwardly opening recess which is symmetrical about a line angularly disposed to the longitudinal axis of the shank, said recess being provided with a flat bottom wall disposed at an angle to the top face and opposed parallel side walls extending upwardly from and perpendicular to said bottom wall, said bottom wall further being provided with an internally threaded bore-hole the axis of which is perpendicular to said bottom wall, a carbide-tip disposed in snug-fitting relation within the recess, said carbide-tip having a V-shaped cutting point formed by rearwardly diverging flat faces which are symmetrical about the longitudinal center line of the tip and at their rearward ends merge into straight parallel side faces disposed in snug-fitting engagement against the side walls of the recess whereby to prevent lateral rocking movement between the tip and the shank when the tip is under the stresses normally encountered during cutting operations and being provided with a transverse aperture disposed in registering alignment with the bore-hole, and screw means operatively disposed through the aperture and threadedly engaged within the bore-hole for retentively holding the tip in the recess.

4. A carbide-tipped cutting tool comprising a shank having a flat top face and a forward end contoured to form a leading edge having front and side clearances, said front end being cut away in its upper portion and having a forwardly and upwardly opening recess which is symmetrical about a line angularly disposed to the longitudinal axis of the shank, said recess being provided with a flat bottom wall disposed at an angle to the top face and opposed parallel side walls extending upwardly from and perpendicular to said bottom wall, said bottom wall further being provided with an internally threaded bore-hole the axis of which is perpendicular to said bottom wall, a carbide-tip disposed in snug-fitting relation within the recess, said carbide-tip having a V-shaped cutting point formed by rearwardly diverging flat faces which are symmetrical about the longitudinal center line of the tip and at their rearward ends merge into straight parallel side faces disposed in snug-fitting engagement against the side walls of the recess whereby to prevent lateral rocking movement between the tip and the shank when the tip is under the stresses normally encountered during cutting operations and being provided with a transverse aperture disposed in registering alignment with the bore-hole, screw means operatively disposed through the aperture and threadedly engaged within the bore-hole for retentively holding the tip in the recess, and a pad-forming shim interposed between the tip and the bottom of the recess, said shim being formed of relatively soft metal for absorbing shock and slight irregularities in the under face of the tip.

References Cited in the file of this patent

UNITED STATES PATENTS

| 1,577,952 | Carnegie | Mar. 23, 1926 |
| 2,414,811 | Hollis, Jr. | Jan. 28, 1947 |
| 2,480,226 | Deibert | Aug. 30, 1949 |

FOREIGN PATENTS

| 476,480 | Germany | May 21, 1929 |
| 572,063 | Great Britain | Sept. 20, 1945 |

OTHER REFERENCES

Tool and Die Journal, July 1946, pages 80–83.

Catalogue 49 of Kennametal, Inc., Latrobe, Pa., issued May 1949, pages 17 and 50–52.

Kennametal Cemented Carbide products, Catalog 48, issued June 1948.